(12) United States Patent
Russell-Maynard

(10) Patent No.: US 10,292,407 B2
(45) Date of Patent: May 21, 2019

(54) USE OF EXPANDED CONSTITUENTS AND MANUFACTURE OF PRODUCTS THEREFROM

(71) Applicant: Nestec SA, Vevey (CH)

(72) Inventor: John Russell-Maynard, Orange (AU)

(73) Assignee: NESTEC SA, Vevey (CH)

(*) Notice: Subject to any disclaimer, the term of this patent is extended or adjusted under 35 U.S.C. 154(b) by 1048 days.

(21) Appl. No.: 13/755,593

(22) Filed: Jan. 31, 2013

(65) Prior Publication Data

US 2014/0037784 A1    Feb. 6, 2014

Related U.S. Application Data

(63) Continuation of application No. 10/542,661, filed on Aug. 17, 2006, now abandoned.

(30) Foreign Application Priority Data

Jan. 27, 2003  (EP) .................................. 03001714

(51) Int. Cl.
*A23K 40/20* (2016.01)
*A23K 40/25* (2016.01)
(Continued)

(52) U.S. Cl.
CPC ............ *A23K 40/20* (2016.05); *A23K 20/163* (2016.05); *A23K 40/25* (2016.05); *A23K 50/40* (2016.05)

(58) Field of Classification Search
CPC ...... A23L 1/1805; A23L 1/1802; A23L 1/164; A23L 1/1646; A23L 1/0076;
(Continued)

(56) References Cited

U.S. PATENT DOCUMENTS 3,580,728 A * 5/1971 Gulstad et al. ............... 426/289
3,759,714 A   9/1973 Burkwall, Jr.
(Continued)

FOREIGN PATENT DOCUMENTS

GB  1497090   10/1975
GB  1591406   6/1981
WO  0176386   10/2001

OTHER PUBLICATIONS

WO 2002/078432 Russell-Maynard et al. Oct. 10, 2002, Machine translation.*
(Continued)

*Primary Examiner* — Hong T Yoo

(57) ABSTRACT

The present invention provides methods and products made thereby, wherein a pre-expanded constituent, including an edible constituent, is thermally treated to melt it, preferably in a dynamic process environment, to produce products ranging from high to quite low densities and from very strong to soft to apparently dry textures. The wide range of textures enables the provision of food products such as low calorie, digestible and safe, long duration pet food chews. Non-food products suitable for use in manufacture may also be produced. Cooking is preferably carried in an extruder, preferably at low moisture or in the total absence of added water. The methods of dynamic cooking reduce cost in a number of ways including but not limited to decreased process steps, increased throughput, decreased capital expenses and decreased raw product cost.

46 Claims, 7 Drawing Sheets

(51) Int. Cl.
*A23K 20/163* (2016.01)
*A23K 50/40* (2016.01)

(58) Field of Classification Search
CPC .... A23L 1/1643; A23L 1/0085; A23L 1/0088; A23K 1/1846; A23K 1/003; A23K 1/1853; Y10S 426/808; Y10S 426/805
See application file for complete search history.

(56) References Cited

U.S. PATENT DOCUMENTS 3,962,462 A * 6/1976 Burkwall et al. ............. 426/1
6,904,870 B2 * 6/2005 Russell-Maynard et al. ............. 119/709

OTHER PUBLICATIONS

Kaletunc, Gonul, and Kenneth J. Breslauer, Characterization of Cereals and Flours: Properties, Analysis, and Applications, 2003, Marcel Dekker, Inc. pp. 174-178.

* cited by examiner

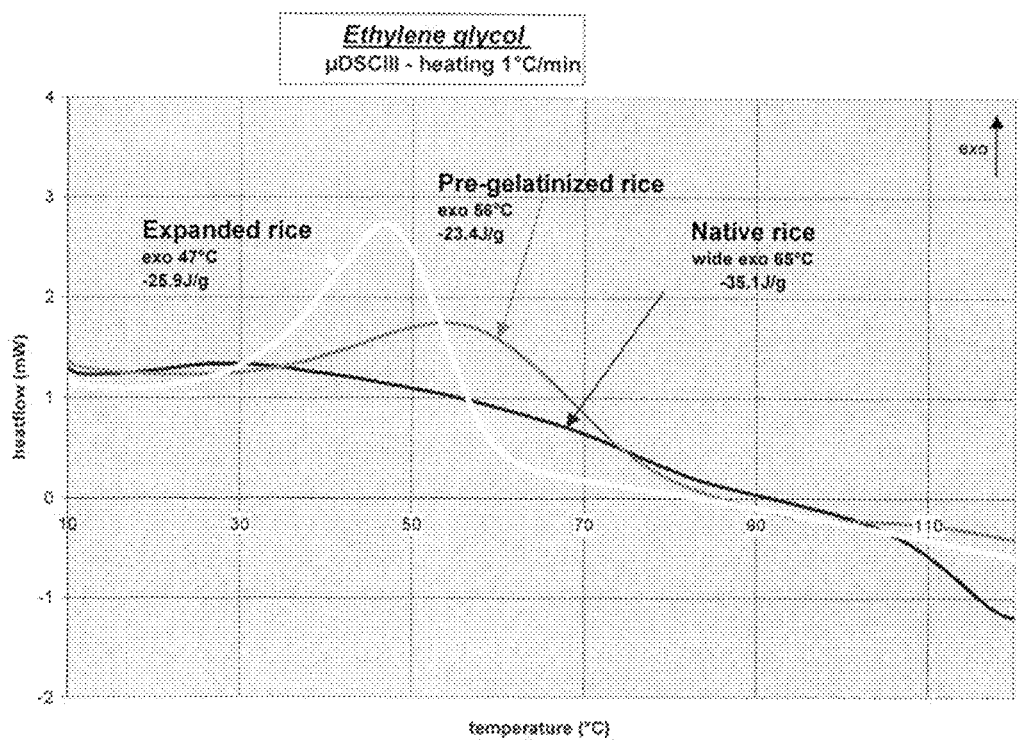
Figure 5: DSC study of floury constituents with ethylene-glycol

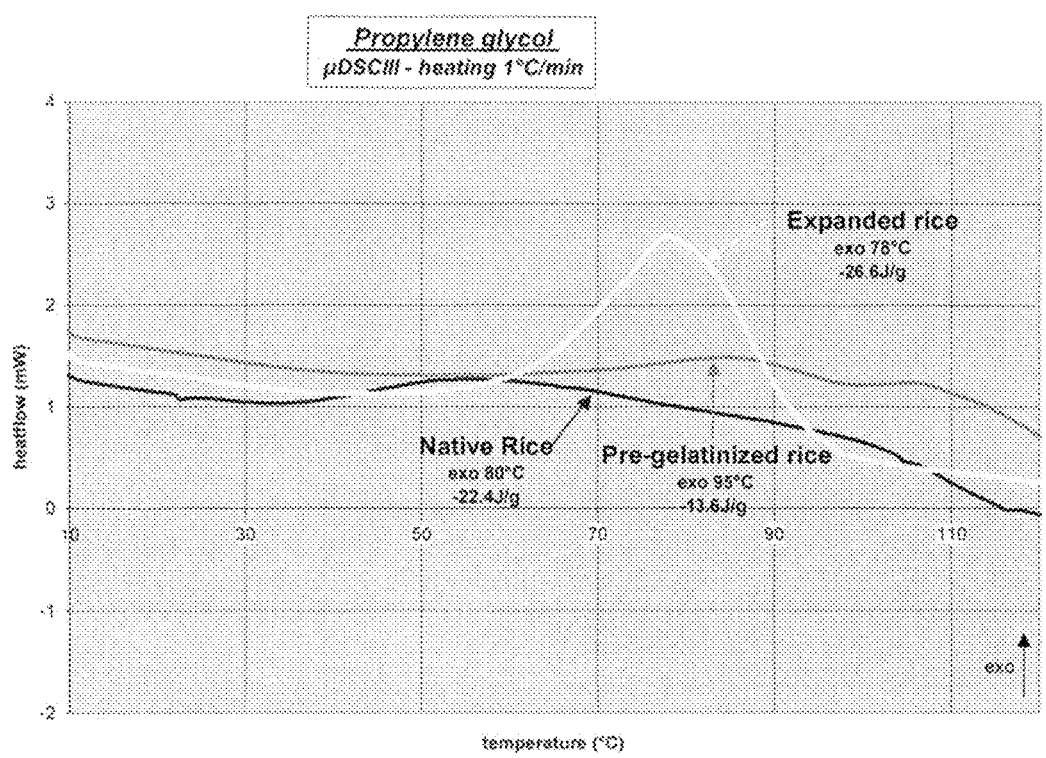
Figure 6 – DSC study of floury constituents with propylene-glycol

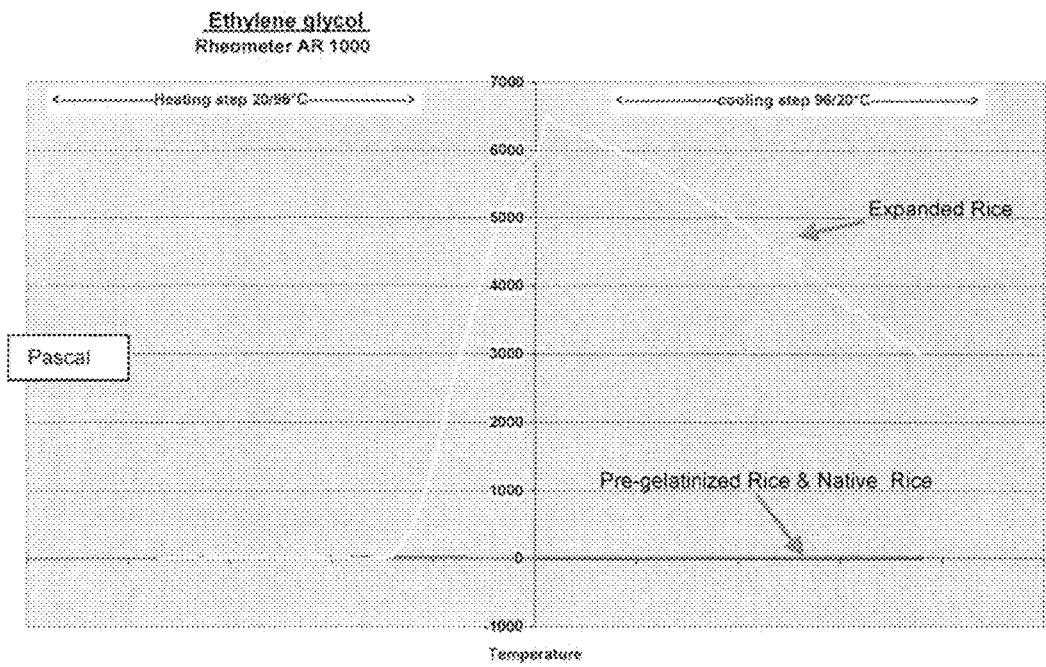
Figure 7 – Rheology Study of floury constituents with ethylene glycol
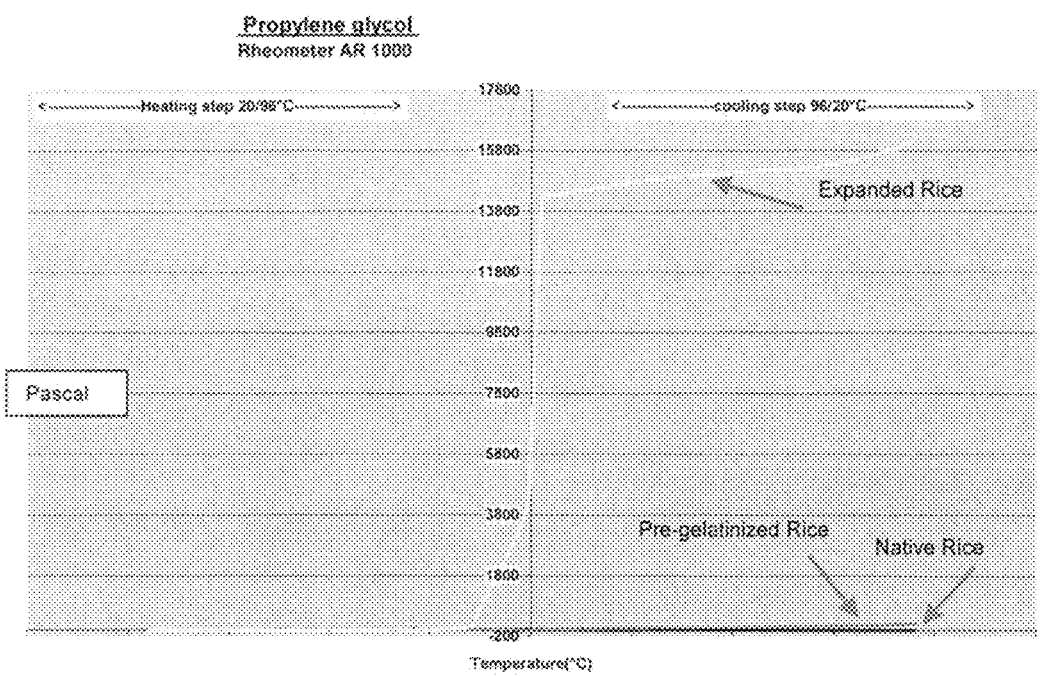
Figure 8 – Rheology Study of floury constituents with propylene glycol

USE OF EXPANDED CONSTITUENTS AND MANUFACTURE OF PRODUCTS THEREFROM

FIELD OF THE INVENTION

The present invention relates generally to bio-plastics products having high structural integrity. The products may include materials of manufacture as well as foods. More specifically, the present invention relates to methods for providing biodegradable polymeric materials of controllable texture and product materials so produced.

BACKGROUND TO THE INVENTION

Numerous methods are available for producing food products and biodegradable polymers. In the case of foods, these methods may be categorized generally as static (still) or dynamic methods. Static methods may be defined as those in which a batch of constituents is disposed in a cooking vessel and allowed to remain still or free of movement while being cooked, such as in an oven baking process or pressure moulding or baking process. These include processes in which the batch of material is caused to move on a conveyor through a cooking apparatus, such as a baking tunnel. Here the constituents would remain still in relation to the surface or vessel on or in which they were being transported.

Dynamic processes are those in which a quantity of constituents is fed into an apparatus—whether in a continuous or semi-continuous stream or batchwise—in which mechanical energy is imparted to these constituents to cause relative movement within the batch or stream while energy is absorbed to cause cooking. Such movement could include active or passive mixing. One dynamic thermal treatment method is extrusion, where constituents are caused to mix with each other while shear is being imparted within the extruder barrel. Extrusion can be used to produce a variety of food or edible products. The internal shear forces generated within the apparatus provide a substantial portion of the heat that is used for cooking the constituents. These products can be designed for human or animal consumption, or both. Another dynamic cooking method makes use of a continuous mixer to cause relative internal movement of the constituents while thermal energy is applied to result in cooking.

With respect to pets, a variety of food products is available. Some of these products are produced through extrusion. Certain extruded products are designed to extend the duration of chewing by a pet, especially dogs, with the goal of providing a product with which pets can chew and enjoy. Pet owners often rate the value of a pet food product or pet snack by its chewing duration. "One bite and it is gone" is a frequent complaint of owners of large dogs, for example.

Products that facilitate extended chewing can help improve dental hygiene and reduce periodontal disease, which is a widespread problem for pet cats and dogs. This is because the natural diet of animals in the wild includes many foods that require extended chewing before the pieces are small enough to be swallowed, contributing to dental hygiene and facilitating digestion. In contrast, the diet of domesticated pets frequently lacks naturally chewy foods, depriving them of the above benefits.

Conventional food processing methods often do not produce products that have textures comparable to naturally chewy foods. Certain attempts have been made, however, to produce pet products having an extended chewing duration. But, most of these products have disadvantages.

Some are simply not edible. When the pets chew or break up and swallow these products, they suffer digestive problems. Some pass undigested through the pet and can contribute to diarrhea and increased fecal volume. Most pet owners want to reduce fecal volume, diarrhea and soft stools. Even some products that claim to be made from edible constituents are not edible in final form, because of processing that fails to ensure digestibility.

European patent application number EP 0 552 897 A1 discloses an edible animal chew product with a flexible cellular matrix containing cellulosic fibers, e.g., 20 to 50% corncobs and oral care additives. Corncobs and cellulosic materials are not readily digestible and can also contribute to diarrhea and increased fecal volume.

There are nevertheless chewy products that are formulated with digestibility in mind. However, some of these prior art chewy products are high in calories. It is desirable that such products therefore be fed as treats or snacks to comprise only a small portion of the pet's diet, so as not to create a dietary imbalance.

A further problem with some prior art chewy products is production cost. Certain chewy products are formulated with pliable materials that are designed to resist the pet's chewing force. The pliable materials tend to be expensive. Attempts to mix pliable materials and less expensive materials have created a complex balancing system in which it is often difficult to ensure that the less expensive materials do not compromise the strength and integrity of the more expensive pliable materials.

Still another problem with certain prior art highly resistant chewable products is safety. For example, one prior art chewable pet toy has a protein based thermoplastic composition with protein levels between 50-70%. High protein products, including those fabricated from refined high protein constituents, are not only expensive but may bring potential danger as well. Some experts believe that high protein levels can contribute to renal failure and to blockage of the urinary tract in pets consuming same.

Some prior art products attempt to increase chewing duration by increasing the rigidity of the product. Certain of these products are virtually rock hard. These products can chip or break a pet's teeth. For example, one such product requires an operating pressure above 10 MPa to break. Many of the harder products of the prior art are glassy in nature and have a tendency to shatter into sharp, hard fragments when bitten. These fragments can lodge in the animal's throat or injure its mouth. This is especially a problem with products produced by high pressure injection molding techniques.

Product design also plays an important role in producing a product that is safe and has a long chewing duration. For example, some non-glassy products of the prior art may not shatter, but may be poorly designed, causing extensive bleeding of the gums when chewed. In part, one of the problems of prior art chewy food products is that they have a limited range of textures to choose from, culminating in products having a texture that causes bleeding of the gums.

Furthermore, the textures of many chewy products are often unappealing and unpalatable. For example, extruded dry pet foods are typically provided in hard lumps and have a dry, dusty appearance. They can be inconvenient for the consumer to handle. Still further, some prior art products are unstable, so that their texture changes with time and they lose desirable characteristics.

Some prior art chewy products are based on starch. Converting starch-based materials into solid articles is known. However, the injection molding equipment that is typically used to convert such starch-based materials is expensive and complex to operate and known methods of solidifying starch-based materials provide a limited range of textures.

Extruding food constituents at low water activities, although known, has until now been fraught with difficulty. The constituents required for such extrusion were often expensive and produce a limited range of textures. When processing and cooking food, bio-polymers, such as starch and proteins, unravel first and then recombine, forming a desired structure, e.g., a biscuit shape. If this unraveling and recombination is restricted or interrupted, the resulting products have little binding and are relatively weak. Unraveling can only occur in the liquid phase and is facilitated by hydration of the unfolding polymers.

At low water activities there is little water available. These systems hence have limited hydration potential. Conventional extrusion processes are therefore operated at high water activity levels, wherein a large amount of water is added to facilitate hydration. The large amount of water necessitates energy-intensive and environmentally unfriendly post-extrusion drying or the adding of acid and other preservatives. This often has undesirable consequences for the products; for example, the water restricts the range of textures that can result.

Extrusion of pet foods is typically conducted at high moisture levels, e.g., approximately 26% moisture, and high water activities, e.g., $a_w$ greater than 0.95. However, these parameters are too high to produce the textures needed for products of extended chewing duration. The water activity for extended chewing products has typically been less than 0.65, with moisture contents of about 7.0% to 17% and with 10% to 20% of total solvent by weight. At these water activities, however, if the methods of the prior art are used, there is insufficient water for hydration, and it is necessary to cook at very high temperatures and pressures or for extended periods, which frequently results in high levels of starch damage and/or burning of the products.

A need therefore exists for improved food products that can provide a long chewing duration, are edible and have improved textures and for methods of producing same.

A need exists too for a polymeric material that can offer structural integrity suitable for use in manufacturing load-bearing items, such as furniture, supporting devices and containers.

A need exists too for a means of operating a processing facility for producing substantially dry products with reduced environmental emissions.

SUMMARY OF THE INVENTION

The present invention provides a bio-plastics material that may be used in the manufacture of various finished articles. The bio-plastics material is produced from a constituent comprising an expanded material. Preferably it is formed into a coherent mass. This constituent and the material may be selected or obtained from renewable resources such as carbohydrates and food ingredients.

In an embodiment, the constituent is an expanded starch. The constituent is preferably unfermented.

The constituent is thermally treated, preferably in a dynamic environment, to produce the bio-plastics mass. Preferably, shear is imparted to the expanded material, causing it to melt, substantially completely.

In the case of producing a food material, the expanded material is cooked to produce a coherent and firm product mass having a structural integrity that is capable of resisting penetration and fracture, yet is flexible and pliable to order. The product mass is a bio-plastics mass that includes the melted constituent.

The thermal treatment is preferably carried out in the presence of a component other than water that has the capacity to form hydrogen bonds. In an embodiment, cooking is carried out in the absence of added water. The resultant product is a biodegradable polymer and may comprise an amount of the original expanded material of constituent. The amount is preferably a minor amount. In an embodiment, it is a trace amount.

The invention further provides a method for producing a bio-plastics material from an expanded renewable resource such as a carbohydrate. The carbohydrate may be a food constituent. The bio-plastics material may be biodegradable.

In an embodiment, the bio-plastics material and products made therefrom are edible. In an embodiment, the edible products have a long chewing duration and improved texture. The edible product may be a pet food. The pet food may be adapted to have a long chewing duration. It may be penetration resistant to resist the normal bite force expected to be exerted by a dog.

In an embodiment, the bio-plastics material is used in the manufacture of non-food products. The non-food products may be load-bearing. The bio-plastics material may also be formed into structural elements that may be used in the manufacture and assembly of various end products.

According to a second aspect of the invention, a process of manufacturing a product comprising a bio-plastics mass comprises the steps of providing a constituent having included expanded material, and thermally treating so as to melt the constituent and provide a coherent bio-plastics mass.

The process of the present invention, to produce, according to one embodiment, an edible product having a long chewing duration, provides for cooking of the expanded material of the constituent to obtain a product having a desired chewability. The cooking occurs preferably in the presence of a hydrogen bond-forming component, other than water. Preferably, the method is carried out under low moisture conditions. The method provides for the expanded material to be processed under a diverse range of conditions by varying selected cooking parameters to produce products with a broad range of textures. This allows one to produce a food, such as a pet food or a pet snack, that has a long chewing duration. Preferably, during cooking, shear is imparted to the expanded material of the constituent. In an embodiment, the cooking is carried out in an extruder.

The expanded constituent comprises an edible material that has undergone expansion to define a porous matrix of one of more cooked bio-polymers. The cooked bio-polymer(s) may be gelatinized starch. Expansion may be accomplished by subjecting the unexpanded edible material to a condition that brings about sudden and extensive formation of gas bubbles therein, resulting in expansion of the material at both a microscopic and macroscopic level as bubbling gas tries to escape. This condition may be attained by subjecting the unexpanded edible material to rapid heating or to a pressure drop of sufficient magnitude and of sufficiently short duration to cause substantially all of the expansion in the material prior to its cooking to form the body, or to a microbial gas-generating process, for example fermentation. Fermentation, in an embodiment, may be performed by leavening. In an embodiment, the expanded material is at least partially fermented.

The rapid heating, preferably includes the sudden application of intense heat. The pressure drop is preferably rapid and is carried out for example in less than 10 minutes, further preferably in less than about 6 minutes. In an embodiment, the pressure drop is at least about 200 kPa. Preferably it is at least about 350 kPa. In the sense that the constituent is already expanded before it reaches the cooking stage of this invention, it can be referred to as "pre-expanded" as well as "expanded".

The expanded constituent is preferably starch based. In an embodiment, the starch-based constituent includes pre-expanded cereal particles. The cereal particles may be pre-expanded breakfast cereals. In an embodiment, the pre-expanded constituent is selected from the group consisting of expanded rice, expanded millet and expanded wheat and combinations thereof. The cereals are preferably ground up to produce pre-expanded particles prior to thermal treatment and melting.

The process of the present invention includes structuring or shaping starch-based articles in general, and is not limited to producing edible long chewing duration products for pets. For example, the method produces bio-plastics from carbohydrates and other renewable resources such as food constituents. In an embodiment, the bio-plastics are biodegradable. The products of the present invention have a broad range of textures and exhibit high degrees of flexibility and strength. Additionally, because of the low moisture or added water content, the products of the present invention are prepared without the need for post-extrusion drying.

Thus, according to another aspect of the invention, there is provided a process of manufacturing a digestible product comprising a coherent body comprising the steps of providing a constituent comprising an expanded, edible material, inputting mechanical energy to the material and cooking it until a polymeric matrix forms, defining a body.

a. In a preferred form of the process, it includes introducing a hydrogen bond-forming component other than water to the expanded edible material and causing hydrogen bonds to form in the matrix. The expanded edible material preferably has been expanded through subjection to a pressure drop of sufficient magnitude and of sufficiently short duration to cause substantially all of the expansion in the material prior to its cooking to form the body.

Further, according to the invention, a method for making an edible product comprises the steps of: providing an expanded edible material and thermally treating the material to melt it at least partially, while shear is imparted to the material. Preferably the material is cooked until substantially all of it is thermally converted to a polymer forming a polymeric matrix.

The process of the present invention includes structuring or shaping starch-based articles in general, and is not limited to producing edible long chewing duration products for pets. For example, the method produces bio-plastics from carbohydrates and other renewable resources such as food constituents. In an embodiment, the bio-plastics are biodegradable. The products of the present invention have a broad range of textures and exhibit high degrees of flexibility and strength. Additionally, because of the low moisture or added water content, the products of the present invention are prepared without the need for post-extrusion drying.

The long chewing duration products produced through the methods of the present invention are light, of low density, low in calories, e.g., dietary, and are resistive to the force of a bite, e.g., the bite of an animal or person. The bite force resistance is variable through the methods disclosed herein to customize products for different uses, such as dental hygiene products or a pre-determined optimum chewing period for a snack or other type of food product. The dental hygiene products may be used in a method of tartar control.

In an embodiment, the process of the present invention includes cooking an expanded constituent under low moisture conditions, i.e. in the presence of low levels of water. In an embodiment, the method includes cooking a dry mixture comprising the expanded constituent in the absence of any added liquid until a product having a desired texture capable of sustaining chewing of extended duration is obtained. The desired texture can further be obtained by adding a component capable of forming hydrogen bonds to the dry mixture. The component may include a polyhydric solvent. This may be defined as a molecular species that contains polar or polarisable chemical groups able to establish hydrogen bonds, for example hydroxyl, sulfhydryl, sulfonyl groups and the like, and that has a molecular weight compatible with the expanded amylopectine or amylose steric interaction (i.e. a molecular weight less than or equal to about 800 Å). The polyhydric solvent is preferably non-aqueous. In a preferred form of the invention, the solvent is ethylene glycol or propylene glycol or glycerol.

The process of the present invention includes, in an embodiment, the steps of grinding an expanded, dry constituent material into pre-expanded particles and disposing the pre-expanded particles and a component capable of forming hydrogen bonds in a dynamic thermal treatment device.

In an embodiment, the dynamic device is an extruder. The particles are retained within a section of the extruder for a sufficient period to ensure an extensive and near complete solvation of a sticky extrusion mass. These pre-expanded particles are selected to have a microscopic structure, capable of facilitating rapid solvation by a solvating component. The solvating component is preferably a solvent selected from the group consisting of polyhydric solvents.

In a preferred form of the invention, the starch is, or starch-like polymers of the particles are, substantially fully gelatinized. The pre-gelatinized polymers are found to solvate rapidly when cooked or extruded, due to the structure of the pre-expanded particles. A floury powder produced from the pre-expanded constituents or cereals has a density that is significantly lower than the density of a similar flour prepared from the native or non-expanded source equivalent.

A method of thermally treating the pre-expanded particles pursuant to the present invention includes controlling the energy imparted to the extrusion mass to obtain an optimal texture in the cooked product. Thereafter, this cooked mass of optimum texture can be formed into a broad range of shapes. Examples of suitable shapes in pet food applications include a dog biscuit and an elongate chunk.

Pursuant to the present invention, methods for feeding and/or providing enjoyment to pets are provided. These methods include providing products manufactured from an expanded constituent to have an extended chewing duration, and administering these to a pet to chew, to improve the dental hygiene condition of the pet. The products are preferably low in density and low in calories per volume of product.

The invention thus further provides a product for use in a method of controlling obesity in a pet, the method including administering to the pet a product manufactured from an expanded starch constituent to have low density and low caloric content. The product preferably is chewable by the pet for an extended duration.

According to a further aspect of the invention, a method of operating a food manufacturing plant comprises the steps of providing a cooking apparatus, forming a product by providing a constituent comprising pre-expanded material and operating the apparatus to cook the constituent, controlling a moisture level and water activity level in forming the product, such that the product does not need to be dried after forming. Preferably, no water is added to the constituent.

It is therefore an advantage of the present invention to provide an improved method of operating a food factory to reduce drying requirements and consequently the emission of the by products of drying processes.

It is also an advantage of the present invention to provide an improved polymeric material that can be a food product or a material of manufacture or construction.

Another advantage of the present invention is to provide an improved chewable pet food product.

A further advantage of the present invention is to provide a safe long duration chewable pet food product.

Moreover, an advantage of the present invention is to provide a dietary pet food snack that does not add significantly to the metabolic energy provided by the pet's primary pet food.

Still another advantage of the present invention is to provide an improved pet product that can be used for promoting and maintaining dental hygiene.

Yet a further advantage of the present invention is to provide a low cost method of producing pet foods.

Moreover, an advantage of the present invention to provide a method of producing products having a wide range of textures.

Still further, it is an advantage of the present invention to provide a method of producing products having a light texture but long chewing duration.

Yet further, it is an advantage of the present invention to provide an improved method of producing chewy products for pets.

A further advantage of the present invention to provide a more cost-effective method of producing chewy products.

Additional features and advantages of the present invention will be described in and apparent from the detailed description of the presently preferred embodiments and the figures.

BRIEF DESCRIPTION OF THE FIGURES

FIG. 5 is a graphical representation of the results of a differential scanning calorimetry (DSC) study of certain powdered constituents in the presence of ethylene-glycol FIG. 6 is a graphical representation of the results of a differential scanning calorimetry (DSC) study of certain powdered constituents in the presence of propylene-glycol.

FIG. 7 is a graphical representation of the results of a rheology study of certain powdered constituents in the presence of ethylene-glycol.

FIG. 8 is a graphical representation of the results of a rheology study of certain powdered constituents in the presence of propylene-glycol.

DETAILED DESCRIPTION OF THE INVENTION

Figure 1:
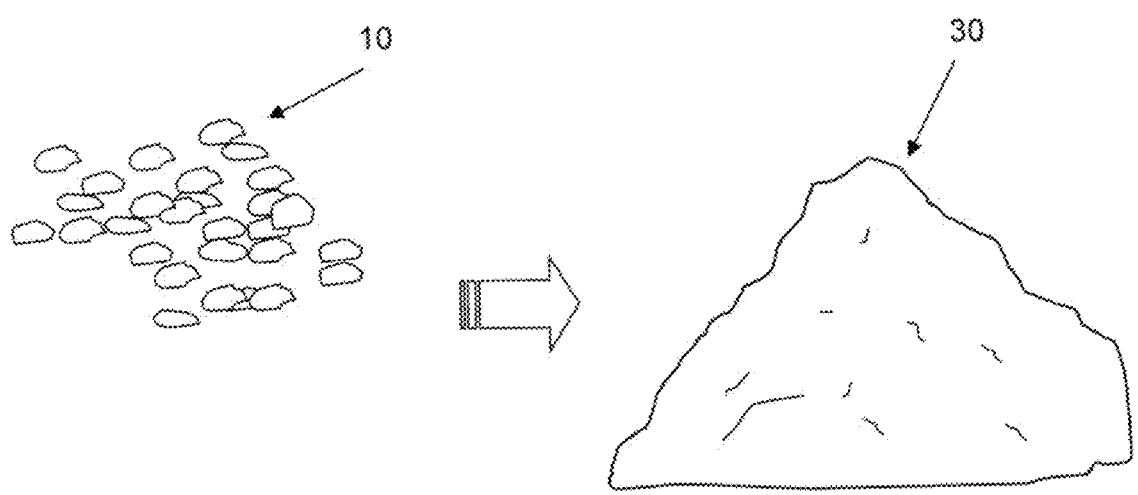
FIG. 1 illustrates schematically the pre-expanded particles of an embodiment of the present invention, which is produced by grinding the pre-expanded particles of the present invention.

The present invention provides a bio-plastics product material that may be used in the manufacture of various finished articles. The methods of the invention produce bio-plastics from expanded materials in feed constituents. These may include carbohydrates and other renewable resources such as food ingredients. In an embodiment, the bio-plastics so produced are biodegradable.

The product materials of the present invention have a broad range of textures and exhibit high degrees of flexibility and strength. The characteristics of end products made with them are widely variable by controlling the processing parameters. The product material produced comprises a polymeric matrix that may be formed into elements that may be utilized in further manufacturing steps to produce a wide range of finished articles.

The invention thus also provides methods for producing edible products and non-edible products. The products may be produced to have a texture that requires them to be chewed for an extended period before they can be swallowed. In an embodiment, edible products are provided for use as chews or treats for pets. However, the present invention is not limited to pet chews or pet food products, as foods and chewable devices for humans may also be produced.

The products of the invention may be produced by a method that includes thermally treating a pre-expanded dry constituent so as to melt it. In the case of food products, the thermal treatment is termed "cooking". However, in the context of this specification, "cooking" will be used in referring to the thermal treatment of the expanded constituent, irrespective of the end product use.

Preferably, cooking takes place in the presence of a component capable forming hydrogen bonds, the component being a substance other than water. The component preferably is capable of solvating the constituent. The component may be a polyhydric solvent. This may be liquid or solid under standard temperature and pressure conditions. Examples of suitable liquid solvents are ethylene glycol, glycerol and propylene glycol. Examples of suitable solid polyhydric solvents are sugars and sorbitol. Water may be present.

The cooking is carried out preferably at low water activity and under low moisture conditions. Prior to the cooking, the expanded constituent and the hydrogen bond-forming component, when used, are preferably mixed together to form a substantially homogeneous mixture, which is then disposed in a cooking vessel. Preferably, the mixture comprises from 10% to about 90% by weight of the constituent and more preferably from 40% to about 80% by weight. Preferably, the mixture comprises from about 0% to about 50% water by weight. Further preferably, the mixture comprises from about 1% to about 15% water by weight. Preferably the mixture comprises from about 0% to 80% by weight of the hydrogen bond-forming component. Further preferably, the mixture comprises from about 4% to about 16% of the hydrogen bond-forming component by weight.

The mixture may further comprise from about 0% to 30% protein. The protein may be derived from a plant or animal source or both. It may be provided as a protein concentrate.

Optional constituents such as are conventionally selected for inclusion in food products may also be added to the mixture. Thus the product body may still further include at least one additional constituent selected from the group consisting of: gelatin, dicalcium phosphate, a nutrient mixture, a reactive sugar, an amino acid, high-amylose or amylo-pectin component (such as starch) and inert (or non-digestible) fillers. The mixture may further include a preservative. Suitable examples include potassium sorbate, sorbic acid, methyl para-hydroxybenzoate, calcium propionate and propionic acid. As water activity decreases, the need (if any) for such preservatives diminishes accordingly. Thus, where no water is added, no preservative is strictly needed.

The presence, in preferred embodiments, of a hydrogen bond-forming component in combination with the pre-expanded constituent contained in the mixture, while requiring the input of substantial amounts of energy in the cooking, nevertheless promotes controlled transformation of the constituent into a stable, coherent and digestible foodstuff body having a desired texture and unique properties by design.

Using pre-expanded particles provides an advantage over particles of the prior art because the pre-expanded particles are highly porous and have a higher number of micro-pores of a size greater than ten times the average molecular radius of the chosen hydrogen bond forming component, for example a polyhydric solvent. Consequently, the pre-expanded particles have a larger external surface area to volume ratio, compared to prior art particles. The external surface area includes all surfaces accessible to molecules of the solvent, including surfaces within the pores, micro-pores and intra-particular tunnels. The pre-expanded particles are found to have a much faster absorption rate for the polyhydric solvent, compared to unexpanded prior art particles. The pre-expanded particles also have a much faster adsorption of polyhydric solvents compared to prior art particles. The pre-expanded particles further have a much faster rate of solvation with a polyhydric solvent compared to prior art particles.

Cooking of the expanded constituent takes place preferably in a dynamic cooking apparatus, for example an extruder or a continuous mixer, or any other suitable system where mixing and cooking of a constituent mix having high viscosity can take place with the impartation of shear. It is thought that the expanded structure of the constituent facilitates access to active sites in the constituent molecules for the hydrogen bond-forming component and that the imparting of shear assists in promoting this access. However, the use of more static cooking methods such as baking and moulding are not excluded.

Referring now to FIG. 1, the present invention includes the use of expanded constituents 10, these having an expanded structure as a result of earlier processing. In preferred embodiments, the constituent containing the expanded material is selected from a renewable resource. The renewable resource may be a food constituent. Preferably it is a carbohydrate. The material may, for example, be starch-based, such as an expanded form of wheat, rice and corn. These may exist in different varieties that may be distinguished from each other on the basis of their amylose to amylopectin ratios. The constituents 10 and particles 30 can include any naturally occurring or modified starch-based composition, for example, in other embodiments, expanded millet or expanded potato.

The expanded material of the constituent may be expanded by fermentation, for example at least partially by leavening, or by subjecting it to a physical process. Suitable physical processes for expanding the material, or a precursor, involve rapid heating to bring about a sharp rise in temperature therein, or by allowing it to expand over a pressure drop, such as by forcing it to pass through an orifice while in a molten state. As the pressure under which the molten material is being held, drops, the material expands (or puffs) and cools, until it reaches a solidified state in which it retains its new expanded form. An example of a suitable constituent that has been expanded over a pressure drop is the well known Kellogg's® Rice Krispies® breakfast cereal, made by the Kellogg Company. An example of a constituent expanded by leavening is bread. Preferably the bread is fractionated into the form of bread crumbs.

The structure of the constituent particles is an important factor in cooking edible expanded constituents in the presence of a hydrogen bond-forming component, in order to produce the products of the present invention, wherein a sufficient degree of hydrogen bonding desirably needs to be established to produce the desired final product properties in a predictable manner. It is postulated that the degree of hydrogen bonding serves to characterize the products according to their properties and influences the final product texture.

Hence the expanded material 10 is ground into expanded particles 30, resembling flour. The material is preferably ground to a size of 500 microns or less, more preferably 350 microns or less. Using the pre-expanded material particles 30 in place of non-expanded or native or pregelatinized cereals or starches produces dramatically different results, such as are embodied in the products of the present invention compared with prior art products.

Figure 2:
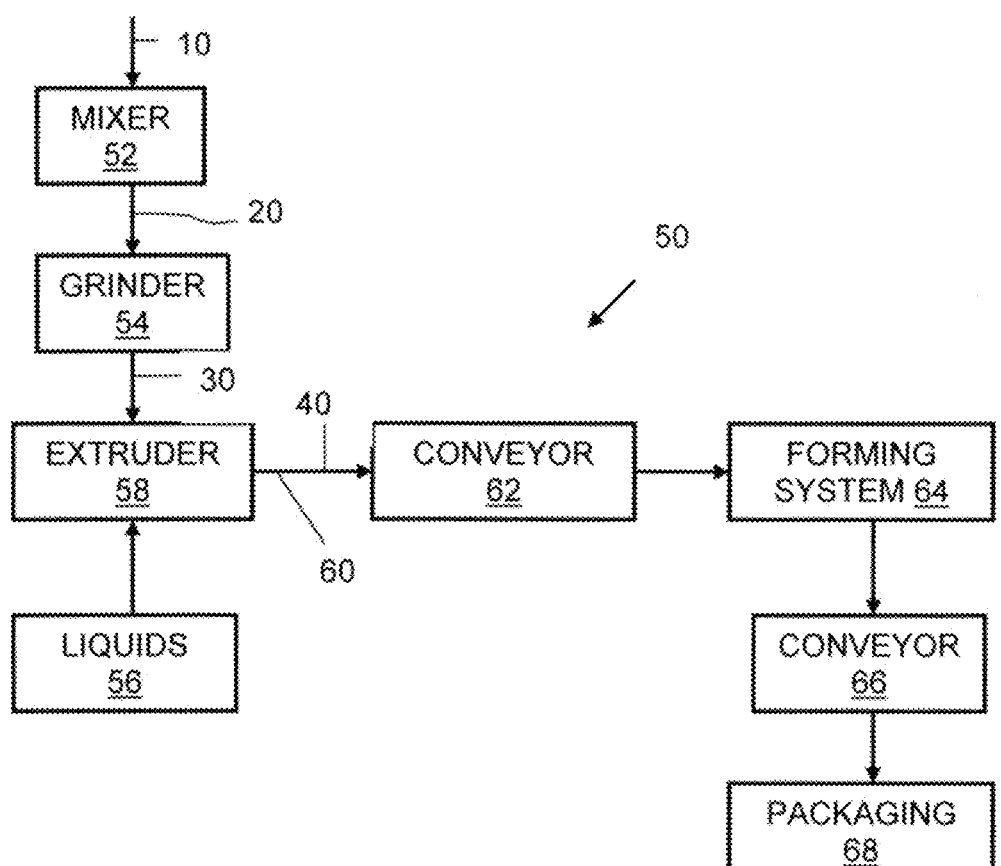
FIG. 2 illustrates schematically an embodiment of an apparatus for making products of the present invention.

Referring now to FIG. 2, a manufacturing apparatus 50 for making the products of the present invention is illustrated generally. As described above, expanded, puffed material 10 is mixed in a mixer 52 along with other desired constituents to produce a substantially dry pre-mix 20. In producing a food product, other constituents may include such as are conventionally included for purposes such as flavouring and nutritional balance. For example, the premix may include gelatin and a nutrient mix, containing legally prescribed and optional vitamins and minerals. These would be omitted or substituted with other functional additives for non-food applications.

The pre-mix 20 is then fed through a grinder 54 to reduce the mix to expanded material particles 30. The particulate expanded material 30 then proceeds to an extruder 58. In comparison with native flour or starches, the powdery expanded material particles absorb significantly more specific mechanical energy ("SME") than would native or pregelatinized starches under like conditions of extrusion in the extruder 58.

The texture of the product 40 leaving the extruder 58 through a die orifice 60 is visibly more elastic and stronger than products of the prior art. The texture of the product 40 is readily variable by manipulating the energy input, which may be accomplished, for example, by changing extruder screw speed, barrel temperature, or by varying inputs of one or more liquids 56. Varying these energy input parameters using the particulate expanded material 30 provides a high amount of variability in achieving a wide range of textured products 40. The textures of the product 40 vary from highly flexible, to highly extensible, to elastic, to very low density, to extremely strong products and any combination of these attributes. All of the products 40 exit the extruder 58 in a rubbery state and, if so desired, can be designed to remain in this state so long as they are properly stored to minimize solvent loss. The expansion and density of the product 40 leaving the extruder by exiting the extruder die 60 is controllable by varying slightly the barrel heater temperatures of the apparatus 50, or by varying the screw speed. By way of example, the screw speed may be varied between about 100 rpm and 350 rpm.

The apparatus 50 is able to impart energy inputs over 1000 kJ/kg to the expanded particles 30 without burning or degrading the product 40 and without compromising the throughput or stability of the extruder 58. It should be appreciated by those of skill in the food art that this is a very high-energy input for the extrusion of food and pet foods and would normally be expected to destroy nutrients and reduce digestibility of the product. The products 40 of the present invention, however, are highly digestible, as will be illustrated below.

Rheology and DSC studies, illustrated by the graphs in FIGS. 5 through 8, demonstrate the specific physico-chemical behaviour of expanded constituent materials of the invention, compared with traditional unexpanded prior art materials, such as rice. These studies are discussed more fully below.

A possible explanation for the surprising digestibility of the food products 40, despite being processed at such a high energy input level, may lie in the increased residence time in the extruder, resulting from the increased volume due to the expanded nature of the constituents 10. This increased residence time of the extrusion mass enables the apparatus 50 to impart energy gently to the mass of particles 30, reducing damage to the nutritional components therein.

According to the invention, the extruder 58 is able to be operated to extrude the pre-expanded particles 30 in the total absence of added water and, in some cases, in the absence of any added liquid 56, so as to achieve a truly dry extrusion, contradicting conventional wisdom that water or other liquid component is necessary for extrusion of dry pet foods and other high volume products. The process makes possible more environmentally friendly extrusion factories that have no dryers, which is advantageous because dryers consume large amounts of energy. By eliminating dryers, significant reductions of odor emissions may also be achieved in whichever industry the above-described process is implemented.

The present invention also eliminates the need for the use of complex high pressure molding systems such as injection molding. In certain instances it is unnecessary to even cool the products 40 to a temperature below the glass transition point of the products 40 before de-molding. This is an advantage because cooling the products stresses them, risking fractures or cracks.

The strength of the resulting product 40 is not dependent on its phase structure. When viewed at high magnification, some products 40 appear substantially as a single phase, while other products 40 appear as a balanced combination of both continuous and discontinuous phases. However, in the products 40 studied at high magnification, traces of the original pre-expanded constituent particles could be identified. Gas bubbles or other inclusions can be incorporated in the products 40 without significantly compromising their texture. The amount of original unconverted expanded material of the constituent in the final product will vary depending on process conditions. Preferably it will be present in no more than a minor amount. The minor amount preferably does not exceed about 5% by weight of the product. In particularly preferred embodiments it is present in no more than a trace amount. In certain embodiments, however, it is desirable to have at least a trace amount.

The products 40 can be formed into various shapes and used for various applications. For cats and dogs, preferred applications include dental chews, toys, food products, and confectionery products. For example, the product 40 may be made penetration resistant to resist the normal bite force expected to be exerted by a dog, in a normal biting event. The bite force resistance is variable through the methods disclosed herein to customize products for different uses, such as dental hygiene products or a pre-determined optimum chewing period. The product of the invention is found to be more resistant to penetration than if the body is made from a material that is in a non-expanded state. The product 40 may also be divided into smaller pieces for adding to a conventional wet pet food to produce, for example, a final product having softer meat-like pieces and harder, longer lasting chewing pieces. The latter are able to assist in preventing tartar formation on the teeth of the pet chewing it. The hard, chewy pieces 40 may be added to a liquid such as a pet milk, gravy or other sauce and sealed into containers, without the pieces undergoing significant disintegration during storage.

In non-food applications in particular, the bio-plastics product material may be formed into elements that can be used in the manufacture or assembly of further products. The material may thus be fashioned into slabs, blocks, cylinders, beams, rods, sheets and the like for further cutting or shaping according to end product requirements. It may also be formed into irregular shapes as desired before final setting on cooling.

Figure 4:
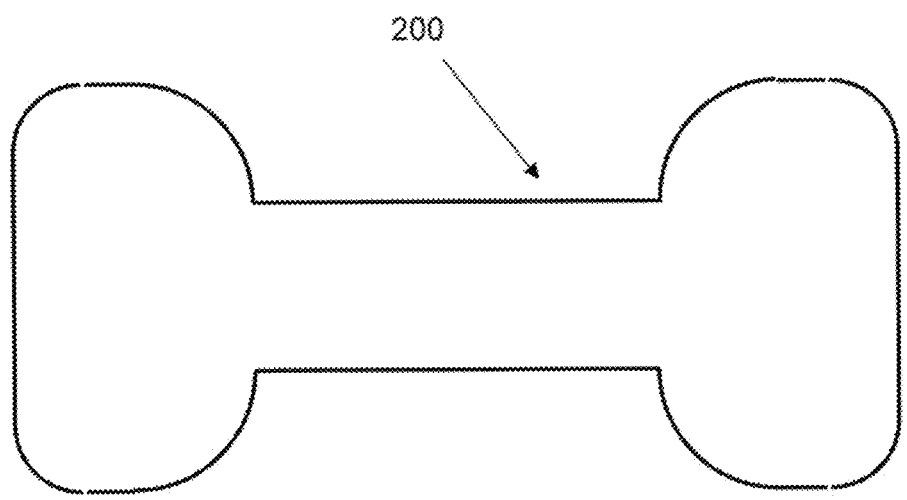
FIG. 4 illustrates, in perspective view, an embodiment of a pet chew product produced pursuant to the present invention.

FIG. 4 illustrates an embodiment of a product 200 produced pursuant to the present invention. Although the product 200 is in the shape of a flattened bone, a great variety of different products and shapes can be produced for pets, animals and humans using conventional shaping techniques.

By way of example and not limitation, examples of food products of the present invention made from pre-expanded constituents are compared with non-expanded constituents follows. The following tests also illustrate various methods of performing the present invention for making the products.

EXAMPLE 1

A comparative test will be described, wherein products made according to the invention, using expanded particles as feedstock, are compared with products produced using unexpanded particles as the base feedstock.

Rice Krispies® were selected as the expanded feed constituent of the present invention. Whole grain rice was to be the comparative non-expanded constituent. Glycerol and water constituted the molecules able to establish hydrogen bonds.

For purposes of simplicity the dry constituents are tabulated in Table 1 and liquid additives in Table 2. Extrusion is selected as the cooking method and extrusion parameters (mechanical energy input level, die pressure and amperage) for determining the various product runs are presented in Table 3.

Each of the products was made by selecting a dry constituent composition 1 or 2, processing it in an extruder 58 under a set of extrusion parameters set out in table 3 and injecting a liquid component blend A or B selected from table 2, the liquid selection depending on the set of extrusion parameters selected.

TABLE 1 constituents (expressed in weight %)

| | Composition No. | |
|---|---|---|
| | 1 | 2 |
| Ground Rice Krispies ®* | 99.7% | |
| Rice, Whole Grain | | 99.7% |
| Potassium Sorbate | 0.3% | 0.3% |
| Total | 100.0% | 100.0% |

*Kellogg Company.

TABLE 2

Injected Liquids (expressed in weight %)

| | A | B |
|---|---|---|
| Dry Mixture | 78.5% | 81.3% |
| Glycerol* | 12.5% | 13.0% |
| Water | 9.4% | 5.7% |
| Total | 100% | 100% |

*Glycerol 86% (water 14% by weight)

TABLE 3

Extrusion parameters

| | Expanded Rice Product | | Native Rice | |
|---|---|---|---|---|
| | 1A | 1B | 2A | 2B |
| SME (kJ/kg) | 678 | 881 | 171 | 167 |
| Amperage (A) | 191 | 246 | 57 | 55 |
| Die pressure (bar) | 19 | 26 | 41 | 57 |

The apparatus used is illustrated schematically in FIG. 2.

First, a dry mix of expanded feed was prepared, the dry mix being selected from the compositions in table 1. To prepare the dry mix, the base constituents were added to a Sovemeca Mixer (available from Sovemeca Ltd., Vermand, France) denoted as the mixer 52 of FIG. 2. Owing to the low density of the expanded edible constituents, it was important to operate with a batch of appropriate size for the mixer to mix efficiently.

The dry mix 20 produced thereby was then carefully ground with a Septu Grinder (available from Septu Ltd., Villeneuve sur Verberie, France, designated the grinder 54 of FIG. 2) to a particle size of less than less than about 350 μm and then re-mixed to produce ground particles 30.

After grinding, the expanded constituent material was metered directly into the inlet of an extruder 58 via a K-tron weighing-belt. The extruder was a twin-screw extruder (EV 53 commercialized by CLEXTRAL ltd., France) with a length-over-diameter ratio of about 36. However, a single screw extruder may equally be used.

A liquid 56 selected from table 2 was injected via pumps monitored by flow-meters and volumetrically controlled automatically by a programmable logic controller.

The ground particles were cooked in the extruder 58 according to one of the set of energy parameters shown in Table 3. A product emerged from the extruder 58 via the die 60, at low pressure and at a temperature between 80 and 110° C. The die 60 and/or die-head was selected to provide sufficient restriction on the flow of the material to ensure that the ground particles remained within the extruder 58 for a time sufficient to effect the desired degree of cooking to form at least a coherent, but still formable body on discharge.

After leaving the die, the product was transported on a conveyor 62 and sent to a forming system 64. The forming system 64 may comprise a variety of components to cut, mold and/or roll the product. For example, the forming system may include one or more of a die-face cutter and a Guillotine (available from Sollich Ltd., Germany). The forming system 64 of the example included a die-face cutter to divide the extrudate into individual food pieces.

The specific devices and operations performed by the forming system 64 can be varied, depending on the texture desired and the ultimate function of the product. It will be appreciated that the apparatus 50 can be operated also to vary the texture of a specific product, before the product reaches the forming system 64, for example, by adjusting the energy input.

After the forming step, the product pieces processed by the die-face cutter were air-cooled to room-temperature and transported along a conveyor 66 to a packaging station 68, where they were packed in hermetically sealed sachets.

Table 4 compares products produced in this Example 1. Products 1A and 18B constitute the product 40 of the present invention, which were made from expanded rice as the expanded edible material 10. Products 2A and 2B were made from native rice, a non-expanded constituent.

TABLE 4

Product compositions (expressed in weight %)

| | 1A | 1B | 2A | 2B |
|---|---|---|---|---|
| Water % | 21.4 | 16.9 | 23.5 | 19.1 |
| Fat % | 1.08 | 1.15 | 1.9 | 2.07 |
| Protein % | 5.74 | 6.14 | 5.67 | 6.06 |
| Carbohydrates % | 70.9 | 74.9 | 59.5 | 62.7 |
| Fibers % | 0.43 | 0.46 | 8.76 | 9.36 |
| Ash % | 0.42 | 0.45 | 0.63 | 0.68 |

With reference to the processing parameters of table 3, it was observed that a higher level of energy is input with products based on expanded edible materials versus products based on native starch. Moreover, low die pressure measured for rice Krispies products means that the viscosity of this product is lower and closer to plastic behaviour than that of native rice.

The mechanical properties were measured by TA-XT2I Texture analyzer (Rheo Ltd., Champlan. France), a system designed to simulate the biting action of a dog's teeth, and by three-points flexion. The TA-XT2I Texture analyzer was equipped with a specially designed cone-shaped penetrometry probe 12 mm long. The probe was pushed slowly into the products, descending at a rate of 2 mm/s. Measurements were made of the force required to insert the probe into the products.

Standard three-point flexion tests were carried out using a traction machine (LLOYD ltd, Fareham Hampshire, UK) with a speed of 50 mm/min and a maximum flexion of 40 mm. Results are illustrated in Table 5.

The products 40, produced from the expanded edible material(s) 10 and designated 1A and 1B, were found to be strong and plastic, as indicated by the fact that the flexion distance to breaking-point was higher than that of products 2A and 2B, produced from native rice. The non-expanded products 2A and 2B were found to be very weak in terms of texture and lacked significant structural elasticity.

TABLE 5

Texture Analysis

| | Product | | | |
|---|---|---|---|---|
| | 1A | 2A | 1B | 2B |
| Penetration Force Fmax (N) | 184 | 82 | 265 | 158 |
| Penetration Distance* (mm) | 5.9 | 4.26 | 5.97 | 5.04 |
| Flexion Force Fmax (N) | 630 | 184 | 720 | 275 |
| Slope (N/mm) | 67 | 56 | 93 | 80 |
| Flexion Distance** (mm) | 24 | 4.6 | 30 | 4.1 |

*For a 12 mm spindle to fully penetrate product
**Measured at breaking point

EXAMPLE 2

In Example 2, the digestibility of a product 40, made according to the present invention, was tested. The product was made by extrusion using the recipe of constituents presented in Table 6 and with injected liquids mixture A of Table 2. The extrusion conditions are the same as given in Table 3 of Example 1.

TABLE 6

Product 3A

| INGREDIENTS | PRODUCT 3A |
|---|---|
| Ground Rice Krispies ® | 87.5% |
| Gelatin 100 Bloom | 6% |
| Potassium sorbate | 0.3% |
| Dicalcium phosphate | 5.2% |
| Nutrient mixture | 1% |
| Total | 100% |

Eight adult beagle dogs (4 female, 4 male) in good health were individually housed and fed once per day with a test diet.

The eight dogs were fed a diet that was a combination of the products 40 of the present invention and commercial canned pet food (Winalot—a trade mark of Societé des Produits Nestlé). These foods were the sole source of nutrition for the animals for the duration of this trial. The daily energy ration for each of the dogs was calculated based on its daily metabolic energy (ME) requirement. The ME was calculated using the formula:

$$ME\ requirement = 132 \times BW^{0.75}$$

Before commencing the trial period, the products 40 were analyzed for moisture, protein, fat, ash, fibre and gross energy. The ME of the products was calculated using the formula:

$$ME\ of\ product = (3.5 \times \%protein) + (8.5 \times \%fat) + (3.5 \times \%carbohydrate).$$

The dogs were fed a diet that was a combination of the canned commercial pet food at 75% of the daily ME requirement and the products of the present invention at 25% of the daily ME requirement. Fresh water was provided at all times.

The dogs were fed for five days on the above diet. This allowed the dogs to adapt to the diet. After five days, the weight of each dog was measured to calculate the ration for the next five days, which constituted the collection phase. The dogs continued the same diet the next five days of the collection phase. During the collection phase, the dog's feces were collected.

On the first day of the collection phase, a 1 g iron oxide marker was mixed into the food of each dog to indicate the start of the fecal collection (the first feces to be collected were red). During the remaining 4 days the diet proceeded normally without any additives. After the 5 day collection phase period, 1 g of red iron oxide was again mixed into the food to mark the end of the fecal collection phase (the red feces were not collected).

Daily food intakes and fecal score were recorded for each of the eight dogs. The feces for each dog were stored in a freezer at −20° C. The feces for each dog was then pooled for the five day collection period (all feces up to the final red marker). The total wet weight of the feces was recorded. All eight dogs were re-weighed at the end of the trial.

The feces for each dog was dried and the weight of same recorded. The dried feces was then ground and analyzed for moisture, protein, oil, ash and gross energy. The digestibility for each dog was then calculated using the standard AAFCO methodology, where:

Dry Matter Digestibility(%)=g of $DM$ consumed−g of $DM$ in feces×100 i. g of Dry Matter Consumed
(where "g" represent mass in grams)

Protein Digestibility(%)=g of protein consumed−g of protein in feces×100

1. g of Protein Consumed

Fat Digestibility(%)=g of fat consumed−g of fat in feces×100 a. g of Fat Consumed

Energy Digestibility(%)=kcal of $GE$ consumed−kcal of $GE$ in feces×100 i. kcal of GE Consumed

Carbohydrate Digestibility(by difference,%)=similar calculation to that for protein Ash Digestibility(%)=similar calculation to that for protein ME of product(kcal/g)=[kcal of $GE$ consumed−kcal of $GE$ in feces−((g of protein consumed−g of protein in feces)×1.25)]/g of food consumed

TABLE 7A

Results Recorded During Collection Week

| | | Average | Range |
|---|---|---|---|
| Food Intake | g/day | 1110 | 941.0 to 1271.0 |
| | kcal/day | 1643 | 1392.7 to 1881.1 |
| BW Change | % | 0.22 | −3.35 to 3.42 |

TABLE 7B

Stool Consistency

| | | Average | Dogs Contributing |
|---|---|---|---|
| Normal | % 1 | 36 | 8 |
| Structured | % 2 | 58 | 8 |

TABLE 7B-continued

Stool Consistency

| | | Average | |
|---|---|---|---|
| Unformed | % 3 | 5 | 2 |
| Puddle | % 4 | 1 | 1 |
| | | | Range |
| Stool Score | | 1.71 | |
| Output - | g/day | 131 | 104 to 171 |
| | % moisture | 69 | 67 to 73 |
| g def./1000 kcal ing | | 120 | 102 to 158 |

TABLE 7C

Analysis Results

| | | Average Nutrient Content | |
|---|---|---|---|
| | | Food | Feces |
| Moisture | % | 14.24 | 69.4 |
| Protein | % | 19.61 | 9.7 |
| Fat | % | 1.96 | 1.1 |
| Ash | % | 4.70 | 8.64 |
| Crude fibre | % | 0.47 | ** |
| Carbohydrate w/out CF | % | 59.0 | 11.2 |
| Gross Energy | kcal/100 g | 447.3 | 118.5 |

| | | Apparent Digestibility | |
|---|---|---|---|
| | | Average | Std deviation |
| Dry Matter | % | 85.3 | 1.5 |
| Organic matter | % | 88.7 | 1.2 |
| Protein | % | 82.8 | 1.5 |
| Fat | % | 95.4 | 0.6 |
| Ash | % | 34.9 | 7.7 |
| Energy | % | 88.8 | 1.2 |
| Metabolisable Energy: | | 3.73 (kcal/g): | |

NB. Carbohydrates value was calculated by difference from the analysis results of the other nutrients.

Average intakes were satisfactory and sufficient to maintain body weight during the trial. Owing to the high digestibility of the products, the average daily intake was above the theoretical (1643 kcal/day) versus that normally observed for the canned pet food alone (1030 kcal/day).

The fecal quality was satisfactory with 94% of the feces scored as acceptable. No liquid diarrhea was observed. The apparent digestibility of the products was high with average values of: 85.3% (dry matter), 82.8% (protein), 88.8% (energy) and 95.4% (fat).

The mixed diet of 75% canned commercial pet food (Winalot) and 25% of the products of the present invention were as digestible if not more digestible than the canned commercial pet food fed solely. The calculated ME from the digestibility results, corrected for urinary nitrogen loss, was 3.73 kcal/g.

EXAMPLE 3

In Example 3 the chewing duration of products of the present invention was tested using a fixed group of forty dogs. The products were produced according to the parameters of Tables 1, 2 and 3. The products tested were those designated 3A and 4A and a commercial product branded as Jumbone (100 g/Small Dogs), available from Pedigree Masterfoods, Melton Mowbray, UK. These products were formed using circular dies of 25 mm diameter and divided into rods about 130 mm in length.

A veterinarian screened all participating dogs before the trial commenced, to ensure each dog was in good oral health and presented with no oral defects, such as gingivitis, bleeding and/or redness of gums, missing teeth, etc. The test dogs covered a broad range of sizes.

The dogs were presented with the products 3A, 4A and the comparative Jumbone product and their eating behaviour, as seen, for example, in the duration of chewing the products, was monitored. With regard to the determination of chewing duration, only actual chewing time was recorded and any period where the dog stopped chewing was discarded from the calculation of chewing time. At the end of the trial each dog's mouth was re-examined.

It was observed that the dogs took the test products into their mouths, lay down on their bellies and transferred the product to their front paws. They held the product in a slightly inclined vertical manner and began to chew, all using primarily their back teeth. When the dogs finally gnawed the product down to an end piece, they picked the this up with the front teeth, chewing it a number of times further, before swallowing the remainder.

The chewing times and other observations are reported in Table 8. As indicated above, the density of the products varied depending on process conditions. Accordingly, the results are reported in terms of chewing time per unit weight (time/grams) of product.

TABLE 8 chewing time

| Product | Chewing Duration Seconds/Gram # |
|---|---|
| 3A | 15.4 |
| 4A | 3.5 |
| Jumbone (prior art)* | 7.2 |

These times are only relative, as with a different group of dogs, different times will be obtained but the ranking of performances is expected to stay the same.

The dogs appeared very content when eating the products 3A, repeatedly biting forcefully into these products and compressing them until a small piece could be pulled off. The dogs would masticate the separated piece until tearing it into fragments small enough to swallow. Afterwards, the dogs would return to masticating the main body of the product.

Similar behavior was exhibited with non-expanded product of 4A, except that the dogs were observed to break off pieces quickly and ended up masticating for a much shorter period. Little difference was noted for the comparative prior art Jumbone product, except that the chewing time per unit weight was greater than for the unexpanded product 4A.

The conclusion reached was that even at the relatively modest levels of pre-expanded powder constituent contained in the products of the invention, the benefits are apparent, with a substantial improvement in chewing duration compared to prior art products.

EXAMPLE 4

In Example 4, samples of product 2A were subjected to a long-term stability study. The products were stored in hermetically sealed sacs and at 4° C., 38° C. and room temperature (about 22° C.), respectively. At time zero, after one month and after three months, samples of the products were analyzed by a Differential Scanning Calorimetery (DSC) for texture and water activity. The chewing duration of the samples was also tested using a group of dogs as in Example 3.

No significant changes were observed in any of the products or samples of same. This indicates that the products of the present invention remain stable under storage conditions.

EXAMPLE 5

In a laboratory study, three dry mixes were prepared for testing to illustrate the specificity of the present invention. The respective mixes comprised: Rice Krispies (as an example of an expanded edible material), broken rice (native starch, unexpanded) and pre-gelatinized rice (also unexpanded).

In the study, samples of the dry mixes were to be combined with the following respective solvents, selected for their ability to establish hydrogen bonds: Ethylene-glycol and propylene-glycol.

Test 5(a)—Differential Scanning Calorimetry (DSC) Material and Methods

The dry constituent samples were ground to about 0.5 mm and then mixed with the respective solvent in the following weight ratio: 20% dry matter, 80% (solvent+humidity of sample). These "wet" samples were placed into the batch cell of a μDSC III-SETARAM apparatus. The reference cell was filled with the corresponding solvent only (i.e. Ethylene glycol or propylene glycol). The cells contents were analysed by micro differential scanning calorimetry with temperature scanning between 20° C. and +120° C. at a rate of temperature change of 1° C./min.

Each experiment was performed in duplicate and found to be repeatable.

The results of the analyses are shown in the thermograms in FIGS. 5 and 6.

A large exothermic peak was observed for the expanded rice when heated with propylene or ethylene glycol, while only small and broad exothermic interactions were observed with native rice or standard wet-cooked pre-gelatinized rice. These curves demonstrate the specific interaction which occurs between expanded material and the 2 polyols shown as solvent examples.

Test 5(b)—Rheology Studies

Material and Method

Sample Preparation

The constituent samples were ground to about 0.5 mm and mixed with the solvent in the following ratio: 20% dry matter, 80% solvent.

TABLE 9

| Analytical parameters: Rheometer AR1000 Viscoelasticity measurement: | |
| --- | --- |
| Mode oscillation | 1 Hz |
| Heating step | 20 to 96° C. 15 min; (5° C./min) |
| Holding Step | 10 min 96° C. |
| Cooling step | 96° to 20° 15 min; (5° C./min) |
| Deformation | 0.5% |

TABLE 9-continued

| Analytical parameters: Rheometer AR1000 Viscoelasticity measurement: | |
| --- | --- |
| Module | 2 cm serrated steel plate |
| Gap | 1500 μm or 1000 μm |

The G' modulus was recorded in pascals (Pa).

FIGS. 7 and 8 illustrate the results of these studies.

The rheological behavior of the expanded edible material, after being mixed with the polyols of this example and subsequent heating and cooling, resulted in the achievement of gels of exceptional firmness. In comparison, the corresponding samples of native rice or standard wet-cooked pre-gelatinized rice provided only very weak gels when processed under the same conditions.

Thus, laboratory studies also revealed the strength and unique nature of the matrix formed from expanded materials, particularly when blended with hydrogen bond-forming solvents such as propylene glycol or ethylene glycol.

EXAMPLE 6

Figure 3:
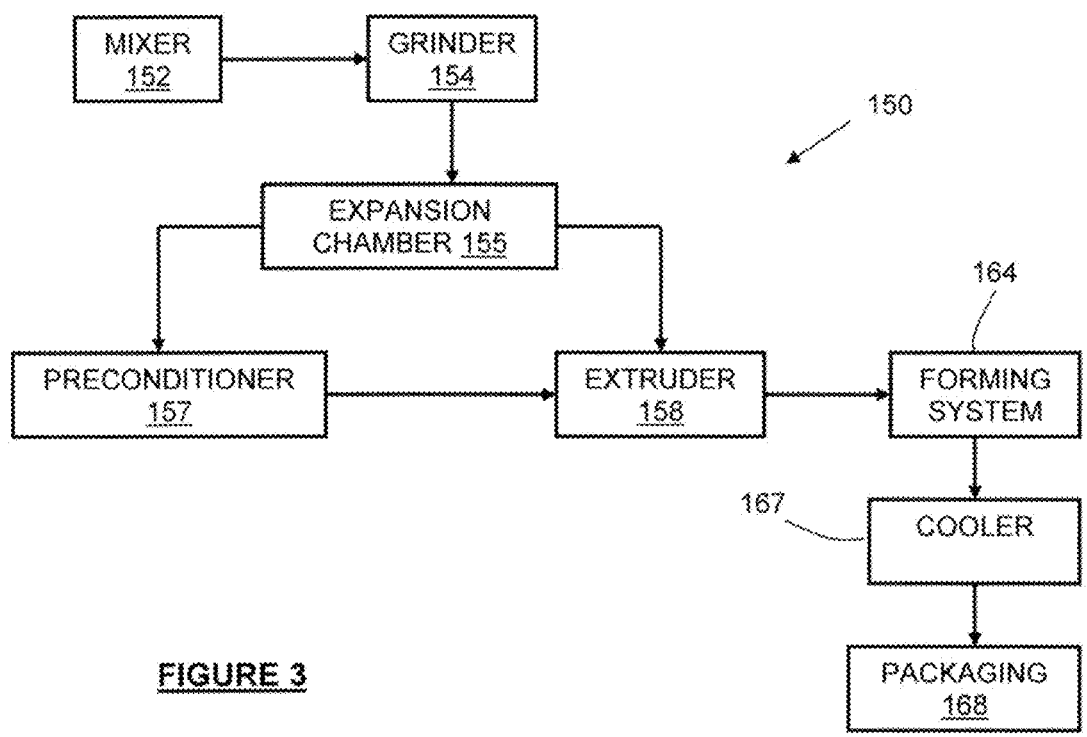
FIG. 3 illustrates schematically an embodiment of another apparatus for making products of the present invention.

Referring now to FIG. 3, an alternative apparatus 150 for forming the products 40 of the present invention is illustrated. The apparatus 150 may be used to extrude high quality pet foods in the total absence of added water, showing that drying ovens may be eliminated from pet food plants, simplifying processes and reducing the capital costs.

The apparatus 150 comprises a one step process, wherein the above described pre-expanded particles 30 are now generated in situ from natural flours during the extrusion process. Extrusion is carried out in the presence of an hydrogen bond forming component in a low moisture system. In this example the extrusion is further assisted by the component being a hot polyhydric solvent and the extruder being operated with high barrel temperatures.

With the apparatus 150, raw, native (e.g., non-expanded) cereals and starch-based constituents are mixed in a mixer 152 with one or more additives illustrated above in Table 1, ground in a grinder 154 to less than about 0.3 mm size and then passed through an expansion chamber 155, before proceeding to the extruder 158 or to an intermediate pre-conditioner 157. The pre-conditioner 157 advantageously is used for adding energy in the form of heat or for pre-hydrating the constituents before they reach the extruder 158. Thus it should be appreciated that it is not necessary to make use of pre-expanded particulate constituents, such as Rice Krispies®, where an unexpanded constituent, such as natural rice, can be placed into the mixer 152 and expanded in the expansion chamber 155 before reaching the extruder 158. However, it is important for the constituent to have been expanded before it reaches the cooking stage.

After the product exits the extruder 158, the product is conveyed to a forming system 164. The finally formed product is then chilled in a cooler 167 before being sent to a packaging station 168 for sealing in an air tight package.

Low moisture extrusion enables moisture sensitive constituents and nutrients to survive for a longer periods of time, especially those that are easily hydrolyzed. Flavor development is enhanced during this extrusion as common flavor reactions, such as the Maillard reaction, normally inhibited by water, are allowed to take place. The absence of water and specifically the hydrolysis by water also aids in preventing the decomposition of flavor components that form due to retro-aldol reactions and the like.

The extrusion in the illustrated embodiment of FIG. 3 can be totally liquid-free and performed using a solid polyhydric solvent, such as a sugar or sorbitol. The pet foods extruded in the very low or no moisture systems are very strong mechanically and structurally and consequently have a long chewing duration when fed to a pet such as a dog.

EXAMPLE 7

A high level of amylose is added to the pre-expanded feedstock of example 6 and this is processed in the apparatus of FIG. 3, making use of the pre-conditioner 157 for preliminary heating. The resultant extrudate is cooled and formed into chunks designed to have long chewing duration when fed to dogs. These are placed into containers containing a commercial wet pet food product made up of emulsified chunks in gravy, known as "Winalot". The containers are hermetically sealed and this composite product is stored for 90 days. The containers are opened and the extruded chunks are examined. It is found that the chunks have not significantly disintegrated into the wet petfood and have substantially maintained their integrity.

By way of example and not limitation, further examples of constituent combinations (in weight %) for manufacturing products of the present invention are given in the following tables.

| Dry Mix Number: 1 | Wt % |
|---|---|
| Expanded Wheat (Whole) (Dry) | 82.43 |
| Pork Gelatin Bloom 100 (Fine Mesh Primarily <100 μm) | 11.30 |
| Vitamin Mineral Mix | 0.43 |
| Potassium Sorbate | 0.33 |
| Dicalcium Phosphate | 5.43 |
| Iron Oxide Yellow | 0.08 |
| Total | 100.00 |

| Dry Mix Number: 2 | |
|---|---|
| Rice Bubbles (Krispies) (3-5% Moisture) | 44.25 |
| Expanded Wheat (Whole) (Dry) | 44.25 |
| Poultry | 4.06 |
| Vitamin Mineral Mix | 0.43 |
| Methyl para-hydroxybenzoate | 0.46 |
| Dicalcium Phosphate | 5.42 |
| Iron Oxide Yellow | 0.06 |
| Triglycerides | 1.07 |
| Total | 100.00 |

| Dry Mix Number: 3 | |
|---|---|
| Rice Bubbles (Krispies) (3-5% Moisture) | 60.0 |
| Poultry | 11.0 |
| Potassium Sorbate | 0.6 |
| Calcium carbonate | 2.0 |
| Sulphur | 0.1 |
| Salt | 3.8 |
| Wheat bran | 10 |
| Wheat, whole grain | 12.5 |
| Total | 100 |

| Dry Mix Number: 4 | |
|---|---|
| Rice Bubbles (Krispies) (3-5% Moisture) | 45.0 |
| Poultry | 16.3 |
| Pork Gelatin Boom 100 (Fine Mesh Primarily <100 μm) | 3.7 |
| Potassium Sorbate | 0.6 |
| Calcium carbonate | 1.0 |
| Sulphur | 0.1 |
| Salt | 3.8 |
| Corn gluten | 24.5 |
| Total | 100 |

| Dry Mix Number: 5 | |
|---|---|
| Rice Bubbles (Krispies) (3-5% Moisture) | 92.8 |
| Pork Gelatin Bloom 100 (Fine Mesh Primarily <100 μm)* | 6.0 |
| Propionic acid | 0.2 |
| Nutrient Mixture | 1.0 |
| Total | 100 |

| Dry Mix Number: 6 | |
|---|---|
| Expanded Millet** | 82.5 |
| Pork Gelatin Bloom 100 (Fine Mesh Primarily <100 μm)* | 11.0 |
| Potassium Sorbate | 0.3 |
| Dicalcium Phosphate | 5.2 |
| Nutrient Mixture | 1.0 |
| Total | 100 |

**Supplied by Dutch Gelatine Ltd.

| Dry Mix Number: 7 | |
|---|---|
| Expanded wheat** | 82.5 |
| Pork Gelatin Bloom 100 (Fine Mesh Primarily <100 μm)* | 11.0 |
| Potassium Sorbate | 0.3 |
| Dicalcium phosphate | 5.2 |
| Nutrient Mixture | 1.0 |
| Total | 100 |

| Dry Mix Number: 8 | |
|---|---|
| Rice Bubbles (Krispies) (3-5% Moisture) | 45.0 |
| Pork Gelatin Bloom 100 (Fine Mesh Primarily <100 μm)* | 3.7 |
| Potassium Sorbate | 0.6 |
| Sorbitol | 5.0 |
| Protein concentrate | 40.8 |
| Nutrient Mixture | 4.9 |
| Total | 100 |

| Dry Mix Number: 9 | |
|---|---|
| Rice Bubbles (Krispies) (3-5% Moisture) | 78.7 |
| Pork Gelatin Bloom 100 (Fine Mesh Primarily <100 μm)* | 6.0 |
| Sorbic acid | 0.3 |
| Sorbitol | 14.0 |
| Nutrient Mixture | 1.0 |
| Total | 100 |

The above mixes can be processed into final products in the presence of solvents added within the exemplary weight concentration limits set out below.

| Extrusion Parameters | Max wt %. | Min. wt % |
|---|---|---|
| Dry Mix | 100% | 72% |
| Glycerol (86%) | 16% | 12% |
| Water | 12% | 0% |

It should be understood that various changes and modifications may be made to the presently preferred embodiments described herein. Such changes and modifications can be made without departing from the scope of the present invention and without diminishing its intended advantages. It is therefore intended that such changes and modifications be covered by the appended claims.

The invention claimed is:

1. A product comprising a melted constituent obtained by (i) expanding a cereal to form an expanded cereal which defines a porous matrix of one or more cooked biopolymers, (ii) forming a mixture comprising 10% to 90% by weight of the expanded cereal, 4% to 16% by weight of a non-aqueous hydrogen bond-forming component, and 0% to 50% by weight of water, and (iii) thermally treating the mixture to melt the expanded cereal and provide a coherent bioplastic mass having a temperature between 80 and 110° C., and the porous matrix of one or more cooked biopolymers is present in the product in an amount of no more than 5% by weight of the product.

2. The product of claim 1, wherein the expanding of the cereal comprises fermenting the cereal.

3. The product of claim 1, wherein the expanding of the cereal comprises subjecting the cereal to a physical process.

4. The product of claim 3, wherein the physical process comprises subjection of the cereal to (i) an application of heat or (ii) a pressure drop of at least about 200 kPa of less than 6 minutes duration to cause all of the expansion in the cereal.

5. The product of claim 4, wherein the expanded cereal is selected from the group consisting of expanded rice, expanded millet, expanded wheat, expanded corn, and expanded oats.

6. The product of claim 1, wherein the expanded cereal has been thermally treated under shear conditions to form the coherent bioplastic mass.

7. The product of claim 1, wherein the non-aqueous hydrogen bond-forming component is a polyhydric solvent.

8. The product of claim 7, wherein the polyhydric solvent is selected from the group consisting of ethylene glycol, glycerol, propylene glycol, sorbitol and combinations thereof.

9. The product of claim 1, wherein the bio-plastics mass comprises a polymeric matrix.

10. The product of claim 1, wherein the product is digestible.

11. The product of claim 10, wherein the product is a pet food.

12. The product of claim 1, wherein the coherent bioplastic mass is sufficiently penetration-resistant to resist penetration by a tooth of a dog exerting bite force thereon.

13. The product of claim 1 wherein the thermally treating of the mixture comprises extrusion of the mixture.

14. The product of claim 13, having a texture that has been produced by manipulating an energy input into an extruder that extruded it.

15. The product of claim 1, wherein the coherent bioplastic mass forms a coherent body of the product that is more resistant to penetration than if the coherent body is made from a material that is in a non-expanded state.

16. A method of removing tartar from the teeth of a pet, the method comprising administering the product according to claim 1 to the pet.

17. A process of manufacturing a product, the process comprising the steps of:
expanding a cereal to form an expanded cereal which defines a porous matrix of one or more cooked biopolymers;
forming a mixture comprising 10% to 90% by weight of the expanded cereal, 4% to 16% by weight of a non-aqueous hydrogen bond-forming component, and 0% to 50% by weight of water; and
thermally treating the mixture to melt the expanded cereal and provide a coherent bio-plastics mass having a temperature between 80 and 110° C., and the product comprises the coherent bio-plastics mass and no more than 5% by weight of the porous matrix.

18. The process of claim 17, wherein the bio-plastics mass comprises a polymeric matrix.

19. The process of claim 17, wherein substantially all the expanded cereal is melted.

20. The process of claim 17, wherein the thermally treating of the mixture is carried out in the absence of added water.

21. The process of claim 17, wherein the thermally treating of the mixture is carried out in the absence of added liquid.

22. The process of claim 17, including maintaining contact between the hydrogen bond-forming component and the expanded cereal until hydrogen bonds form in the coherent bio-plastics mass.

23. The process of claim 22, wherein the hydrogen bond-forming component is a polyhydric solvent.

24. The process of claim 23, wherein the polyhydric solvent is selected from the group consisting of ethylene glycol, glycerol, propylene glycol, sorbitol and combinations thereof.

25. The process of claim 17, comprising grinding the expanded cereal into pre-expanded particles that are used in the thermally treating of the mixture.

26. The process of claim 17, wherein the expanding of the cereal comprises subjecting the cereal to a physical process.

27. The process of claim 26, wherein the physical process comprises subjecting the cereal to (i) an application of heat or (ii) a pressure drop of at least about 200 kPa and of less than 6 minutes duration to cause all of the expansion in the cereal.

28. The process of claim 27, wherein the expanded cereal is selected from the group consisting of expanded rice, expanded millet, expanded wheat, expanded corn, and expanded oats.

29. The process of claim 17, including the step of forming particles from the expanded cereal before the forming of the mixture and the thermally treating of the mixture.

30. The process of claim 17, wherein the thermally treating of the mixture comprises imparting shear to the mixture.

31. The process of claim 30, wherein the shear is imparted by extruding the mixture in an extruder.

32. The process of claim 31, including controlling expansion of the mixture leaving the extruder.

33. The process of claim 31, including varying the texture of the bio-plastic mass by varying at least one parameter selected from the group consisting of: varying the input energy of the extruder, varying the expanded cereal, adding at least one dry additive to the expanded cereal, and adding at least one liquid to the expanded cereal.

34. The process of claim 31, including varying at least one of an extruder screw speed and an extruder heater temperature.

35. The process of claim 31, including controlling the density of the mixture as the mixture is extruded.

36. The process of claim 17, including controlling the temperature of the mixture during the thermal treatment step.

37. The process of claim 17, including dividing the coherent bio-plastics mass into pieces and placing the pieces into wet food and/or a liquid.

38. A method of operating a food manufacturing plant comprising the steps of:
providing a cooking apparatus;
expanding a cereal to form an expanded cereal;
forming a mixture comprising 10% to 90% by weight of the expanded cereal, 4% to 16% by weight of a non-aqueous hydrogen bond-forming component, and 0% to 50% by weight of water;
operating the cooking apparatus to thermally treat the mixture, in the presence of a non-aqueous hydrogen bond-forming component, to melt the expanded cereal and produce a coherent bio-plastics mass having a temperature between 80 and 110° C. and comprising no more than 5% by weight of a porous matrix of one or more cooked biopolymers; and
controlling a moisture level and water activity level in forming the coherent bio-plastics mass, such that the coherent bio-plastics mass does not need to be dried after forming.

39. The method of claim 38, wherein no water is added to the expanded cereal.

40. The method of claim 38, wherein no liquid is added to the expanded cereal.

41. The method of claim 38, wherein the hydrogen bond-forming component is a polyhydric solvent.

42. The method of claim 38, including operating the cooking apparatus to impart shear to the mixture.

43. The method of claim 42, wherein the cooking apparatus comprises an extruder, a continuous mixer, or both.

44. The method of claim 38, wherein the expanded cereal has been expanded through subjection to a physical process.

45. The method of claim 44, wherein the expanded cereal is selected from the group consisting of expanded rice, expanded millet and expanded wheat, expanded corn, expanded oats, and combinations thereof.

46. The method of claim 17 wherein the thermally treating of the mixture imparts at least 1,000 kJ/kg to the expanded cereal.

* * * * *